United States Patent
Bentley et al.

(10) Patent No.: US 10,837,605 B2
(45) Date of Patent: Nov. 17, 2020

(54) PIPELINE ENVIRONMENTAL BARRIER SYSTEM

(71) Applicant: Mitigation and Resilience Strategies, LLC, Midwest City, OK (US)

(72) Inventors: Belinda Anne Bentley, Midwest City, OK (US); Ashley Lewis Howard, Pflugerville, TX (US)

(73) Assignee: Mitigation and Resilience Strategies, LLC, Midwest City, OK (US)

(*) Notice: Subject to any disclaimer, the term of this patent is extended or adjusted under 35 U.S.C. 154(b) by 0 days.

(21) Appl. No.: 15/811,614

(22) Filed: Nov. 13, 2017

(65) Prior Publication Data

US 2018/0128426 A1 May 10, 2018

Related U.S. Application Data

(60) Provisional application No. 62/420,336, filed on Nov. 10, 2016.

(51) Int. Cl.
*E02B 11/00* (2006.01)
*A01G 25/06* (2006.01)
(Continued)

(52) U.S. Cl.
CPC .............. *F17D 5/02* (2013.01); *E02F 5/10* (2013.01); *E02F 5/12* (2013.01); *F16L 1/032* (2013.01);
(Continued)

(58) Field of Classification Search
CPC ...... A01G 25/06; A01G 25/16; A01G 25/167; A01G 2025/003; B65G 5/00; E01C 13/06;
(Continued)

(56) References Cited

U.S. PATENT DOCUMENTS 3,309,875 A * 3/1967 Niederwemmer ..... A01G 25/06
405/38
3,383,863 A * 5/1968 Berry ...................... G01M 3/40
405/270
(Continued)

FOREIGN PATENT DOCUMENTS

CA 2226014 A1 * 6/1999 ............. B08B 17/00

OTHER PUBLICATIONS

Albarrie Geocomposites, The SorbWebTM Plus Solution, apparent date of ~ Oct. 2015, available at http://www.albarrie.com/wp-content/uploads/2015/10/SorbWeb-Brochure_rev4.pdf.
(Continued)

*Primary Examiner* — Edwin J Toledo-Duran
(74) *Attorney, Agent, or Firm* — Su Law PLLC; Yi-Ming Su

(57) ABSTRACT

The invention relates to a system and method for containing and mitigating spills and leaks from pipelines. According to one embodiment, the system comprises a pipeline for transporting a liquid; a barrier layer comprising material impermeable to the liquid; a trench excavated with sufficient depth and width to accommodate at least the pipeline as well as the barrier layer; two berms; and backfill. The berms are substantially parallel and positioned on either side of the trench. The barrier layer is disposed to cover the trench and berms, reaching at least the ridgeline of the berms. The pipeline is disposed within the trench above the barrier layer. The backfill is placed on top of the pipeline and the barrier layer, and the backfill is graded to form a grade bridging the ridgelines of the berms.

14 Claims, 4 Drawing Sheets

(51) Int. Cl.
*E03F 1/00* (2006.01)
*F17D 5/02* (2006.01)
*F17D 1/08* (2006.01)
*E02F 5/12* (2006.01)
*F16L 1/032* (2006.01)
*E02F 5/10* (2006.01)
*F17D 5/06* (2006.01)
*F16L 1/11* (2006.01)

(52) U.S. Cl.
CPC .................. *F16L 1/11* (2013.01); *F17D 1/08* (2013.01); *F17D 5/06* (2013.01)

(58) Field of Classification Search
CPC ........ E02B 11/00; E02B 11/005; E03F 1/003; F17C 1/007; F17C 3/005; Y10T 137/1866; Y10T 137/189; Y10T 137/402
USPC ..... 405/36–38, 52, 43–45; 47/1, 2, 48.5, 56, 47/58; 111/1; 273/29 R; 272/3; 239/145; 264/45.9, 45.3, 41; 138/123
See application file for complete search history.

(56) References Cited

U.S. PATENT DOCUMENTS

| | | | | | |
|---|---|---|---|---|---|
| 3,408,818 | A | * | 11/1968 | Hemphill | E02B 13/00 405/37 |
| 3,705,851 | A | * | 12/1972 | Brauer | B09B 1/00 210/747.7 |
| 4,091,800 | A | * | 5/1978 | Fletcher | F24S 10/13 126/567 |
| 4,268,993 | A | * | 5/1981 | Cunningham | E01C 13/083 405/37 |
| 4,352,601 | A | * | 10/1982 | Valiga | B09B 1/00 405/129.7 |
| 4,448,690 | A | * | 5/1984 | Maphis | C02F 3/046 111/125 |
| 4,462,184 | A | * | 7/1984 | Cunningham | E01C 13/083 405/37 |
| 4,543,013 | A | * | 9/1985 | Wagner | E02B 3/16 210/170.07 |
| 4,624,604 | A | * | 11/1986 | Wagner | E02B 3/16 210/901 |
| 4,696,599 | A | * | 9/1987 | Rakoczynski | E02D 31/004 210/170.01 |
| 4,923,333 | A | * | 5/1990 | Timmons | E02D 1/06 210/323.2 |
| 4,960,345 | A | * | 10/1990 | Hurley | E01C 13/02 405/258.1 |
| 4,966,492 | A | * | 10/1990 | Poyda | E02D 31/004 405/129.5 |
| 5,064,308 | A | * | 11/1991 | Almond | E01C 13/083 405/36 |
| 5,078,543 | A | * | 1/1992 | Terrel | E02D 31/004 404/82 |
| 5,174,897 | A | * | 12/1992 | Wengrzynek | B01D 21/0003 210/170.09 |
| 5,197,824 | A | * | 3/1993 | Paurat | B09B 1/00 405/129.7 |
| 5,538,524 | A | * | 7/1996 | Gramckow | A01G 20/20 47/58.1 R |
| 5,544,976 | A | * | 8/1996 | Marchbanks | B32B 27/12 405/129.6 |
| 5,662,983 | A | | 9/1997 | Stark | |
| 5,663,490 | A | * | 9/1997 | Kozen | G01M 3/002 405/54 |
| 5,874,263 | A | * | 2/1999 | Holtzapple | C12M 21/04 435/136 |
| 6,095,720 | A | | 8/2000 | Stark | |
| 6,238,137 | B1 | | 5/2001 | Whitworth et al. | |
| 6,418,644 | B1 | * | 7/2002 | Bykov | E02F 7/02 37/142.5 |
| 7,114,877 | B2 | * | 10/2006 | Wilkerson | E01C 13/02 405/43 |
| 8,784,008 | B2 | * | 7/2014 | Dudding | B09B 1/004 405/129.57 |
| 8,944,720 | B2 | * | 2/2015 | Nolt | B65G 5/00 405/54 |
| 9,556,048 | B1 | * | 1/2017 | Owings | C02F 3/327 |
| 9,783,944 | B2 | * | 10/2017 | Ragsdale, Jr. | E02B 3/10 |
| 2006/0105447 | A1 | * | 5/2006 | Aho | C05F 17/40 435/262 |
| 2013/0089376 | A1 | * | 4/2013 | Nolt | F17D 1/08 405/53 |
| 2013/0121768 | A1 | | 5/2013 | Powell et al. | |
| 2014/0027376 | A1 | * | 1/2014 | Spiroff | C02F 3/28 210/614 |
| 2014/0227035 | A1 | * | 8/2014 | Johnson | E21B 43/00 405/50 |
| 2015/0117954 | A1 | * | 4/2015 | Hwang | B09B 1/006 405/128.15 |
| 2015/0354160 | A1 | * | 12/2015 | Ragsdale, Jr. | E02B 3/126 405/116 |
| 2018/0010311 | A1 | * | 1/2018 | Harris | F16L 3/12 |

OTHER PUBLICATIONS

United States Department of the Interior, Pipe Bedding and Backfill, ~1996, available at https://www.usbr.gov/tsc/techreferences/mands/mands-pdfs/pipebed.pdf.

* cited by examiner

PIPELINE ENVIRONMENTAL BARRIER SYSTEM

CROSS-REFERENCE TO RELATED APPLICATIONS

This application claims the benefit of U.S. Provisional Application No. 62/420,336, filed on Nov. 10, 2016, the entire contents of which are incorporated herein by reference.

FIELD

The embodiments described herein are directed to mitigation and containment of pipeline spills and leaks.

BACKGROUND

Pipelines are essential to the conveyance of liquid goods, particularly hazardous liquids such as crude oil and petroleum products. For example, billions of barrels of crude oil and petroleum products are transported via pipelines each year in the United States.

Given the volume of goods routinely carried by pipelines, leaks and spills are inevitable. It has been estimated that, on average, roughly 200 barrels of crude oil and petroleum products are spilled in the United States each day. Moreover, remediation and recovery entail significant costs. Cleaning up a leak or spill may take months or years with costs soaring into the tens, if not hundreds, of millions of dollars. Local economies may be left in shambles. Furthermore, the ecological effects of such spills can be devastating with affected flora and fauna taking years to recover, if recovery is even possible.

It is accordingly a primary object of the invention to reliably and cost-effectively contain liquid spills and leaks from pipelines.

This is achieved by utilizing relatively low-cost construction techniques and materials to isolate and contain pipelines carrying hazardous liquids, as well as utilizing a notification system to alert observers and bystanders in the event of a leak or spill.

SUMMARY OF THE INVENTION

One embodiment is that of a non-reservoir segment of a system for the containment of pipeline spills and leaks. This non-reservoir segment comprises: a pipeline for transporting a first liquid; a barrier layer comprising material impermeable to the first liquid; a non-reservoir trench excavated with sufficient depth and width to accommodate at least the pipeline as well as the barrier layer; two berms; and backfill.

In this embodiment, the berms are substantially parallel and positioned on either side of the trench; the barrier layer is disposed to cover the trench and berms, reaching at least the ridgeline of the berms; the pipeline is disposed within the trench above the barrier layer; and the backfill is located on top of the pipeline and the barrier layer, forming a grade bridging the ridgelines of the berms.

This embodiment of a non-reservoir segment may be connected to a reservoir segment, thus further comprising a reservoir trench wider than the non-reservoir trench.

In this embodiment, the reservoir trench is connected to the non-reservoir trench; the barrier layer is extended to cover the reservoir trench; and the pipeline is extended and disposed within the trench, and above the barrier layer.

Another embodiment of a non-reservoir segment with a reservoir segment further comprises: two reservoir berms positioned generally about the perimeter of the reservoir trench and connected to the berms of the non-reservoir segments; and the barrier layer is extended to cover at least up to the reservoir berm ridgelines.

Another embodiment of a non-reservoir segment with a reservoir segment further comprises a hazardous liquid sensor for detecting the first liquid, disposed within the reservoir trench and positioned above the barrier layer; and a hazardous liquid indicator operatively coupled to the hazardous liquid sensor.

In another embodiment of a non-reservoir segment with a reservoir segment, a hazardous liquid sensor, and a hazardous liquid indicator, the barrier layer is impermeable to the first liquid and permeable to a second liquid.

In another embodiment of a non-reservoir segment with a reservoir segment, a hazardous liquid sensor, and a hazardous liquid indicator, the barrier layer is impermeable to crude oil, petroleum products, or some combination thereof, and permeable to water.

In another embodiment of a non-reservoir segment, the barrier layer is impermeable to crude oil, petroleum products, or some combination thereof, and permeable to water.

In another embodiment of a non-reservoir segment with a reservoir segment, the barrier layer is impermeable to crude oil, petroleum products, or some combination thereof, and permeable to water.

Another embodiment is that of a non-reservoir segment of a system for the containment of pipeline spills and leaks which comprises: a pipeline for transporting a first liquid; a barrier layer comprising material impermeable to the first liquid; and two berms which are substantially parallel and define a pipeline path which is sufficiently wide to accommodate the pipeline and barrier layer wherein the barrier layer is disposed to cover the pipeline path and the berms, reaching at least the ridgeline of the berms; and the pipeline is disposed within the trench above the barrier layer.

Another embodiment for the non-reservoir segment with a reservoir segment comprises: two reservoir berms which define a reservoir pool for accumulating the first liquid, wherein the reservoir pool is connected to the pipeline path; the reservoir berms are connected to the berms; the barrier layer is extended to cover the reservoir pool and the reservoir berms, reaching at least the reservoir berm ridgelines; and the pipeline is extended such that it is disposed within the reservoir pool above the barrier layer.

Another embodiment of a non-reservoir segment with a reservoir segment further comprises: a hazardous liquid sensor for detecting the first liquid disposed within the reservoir trench and positioned above the barrier layer; and a hazardous liquid indicator operatively coupled to the hazardous liquid sensor.

In another embodiment of a non-reservoir segment with a reservoir segment, a hazardous liquid sensor, and a hazardous liquid indicator, the barrier layer is impermeable to the first liquid and permeable to a second liquid.

In yet another embodiment of a non-reservoir segment with a reservoir segment, a hazardous liquid sensor, and a hazardous liquid indicator, the barrier layer is impermeable to a first liquid, where the first liquid is crude oil, petroleum products, or some combination thereof, and the barrier layer is permeable to water.

In another embodiment of a non-reservoir segment, the barrier layer is impermeable to a first liquid, where the first liquid is crude oil, petroleum products, or some combination thereof, and the barrier layer is permeable to water.

In another embodiment of a non-reservoir segment and a reservoir segment, the barrier layer is impermeable to a first liquid, where the first liquid is crude oil, petroleum products, or some combination thereof, and the barrier layer is permeable to water.

Another embodiment is that of the construction of a non-reservoir segment of a system for the containment of pipeline spills and leaks, comprising the steps of: excavation of a trench with sufficient depth and width to accommodate at least a pipeline for transporting a first liquid, as well as a barrier layer; construction of two berms parallel to the trench; deployment of the barrier layer covering the trench as well as the berms, including up to the ridgeline of the berms, the barrier layer comprising a material impermeable to the first liquid; disposition of the pipeline within the trench and above the barrier layer. deployment of backfill between the berms and grading the backfill to form a grade bridging the ridgeline of the berms.

A further embodiment for the construction of a reservoir segment connected to the non-reservoir segment comprises: excavation of a reservoir trench connected to the non-reservoir trench; extension of the barrier layer to cover the reservoir trench; and extension of the pipeline such that it traverses the reservoir trench.

Another optional embodiment for the construction of the non-reservoir segment and the reservoir segment further comprises: placement of a hazardous liquid sensor within the reservoir trench and above the barrier layer; and operatively coupling the hazardous liquid sensor to a hazardous liquid indicator.

Yet another optional embodiment for the construction of the non-reservoir segment and the reservoir segment further comprises: construction of two reservoir berms positioned generally around the reservoir trench and the two reservoir berms are connected to the berms of the non-reservoir segments; and extension of the barrier layer to cover the sides of the reservoir berms up to at least the reservoir berm ridgelines.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to the present embodiments of the invention, examples of which are illustrated in the accompanying drawings. The accompanying drawings, including sizes and relative distances, are not to scale.

Figure 1:
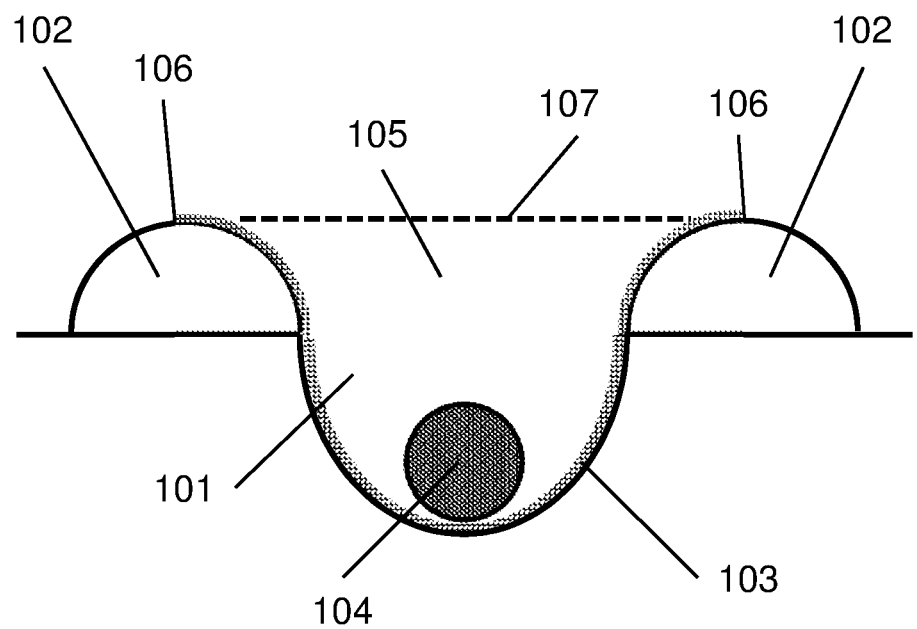
FIG. 1 is a cross-section of a non-reservoir segment of an embodiment of the present invention.

FIG. 1 illustrates an aspect of the present invention, a non-reservoir segment of the buried pipeline barrier system. The non-reservoir segment comprises trench 101, berms 102, barrier layer 103, pipeline 104, backfill 105, ridgelines 106, and grade 107.

In the depicted embodiment, a non-reservoir segment of the pipeline barrier system, trench 101 is excavated and berms 102 are constructed. Trench 101 is excavated from the surface and may be excavated in straight as well as curved portions along the surface.

While, in FIG. 1, trench 101 is shown with curved sides and curved floor, trench 101 may take other forms. Berms 102 are comprised of two berms constructed generally parallel to each other and to trench 101. While, in FIG. 1, berms 102 are directly adjacent to trench 101, such proximity is not required and berms 102 may be positioned at an interval away from trench 101 as industry practices, regulations, local conditions, design objectives, and design constraints allow. Moreover, though berms 102 are shown constructed with a semi-circular profile, berms 102 may take other forms. Berms 102 may comprise construction materials such as earth, rock, concrete, plastics, metallic compositions, or some combination thereof such as rebar.

Berms 102 assist in supporting backfill 104 which may absorb leaked or hazardous liquids.

Adjusting the height or width of berms 102, adjusting the dimensions of trench 101, or increasing the distance between berms 102 and trench 101 may modify the amount of backfill material 105, which may absorb spilled or leaked hazardous liquids, relative to the volume of pipeline 104.

Further, while berms 102 are comprised of two berms, some embodiments may include a single berm constructed in conjunction with a naturally occurring or pre-existing artificial structure which may be used as a second berm.

Barrier layer 103 is then deployed to cover trench 101 as well as berms 102. Barrier layer 103 covers trench 101 in its entirety including the floor and sides of trench 101, and at a minimum, as illustrated, barrier layer 103 also covers the interior sides of berms 102, that is, the trench 101-facing sides of berm 102, up to the ridgelines 106 of each berm 102. Barrier layer 103 may optionally cover a larger portion of berms 102, including covering berms 102 in their entirety.

Though the form of berms 102 may vary, and even perhaps the form of each berm in berm 102 may vary from the other, the ridgelines 106 are typically the line of crests of each berm of berms 102 or, if any of berms 102 have no crest, generally any line along the highest portion of the berm. Moreover, each ridgeline 106 of the individual berms in berm 102 may differ. Though not illustrated, if berms 102 are constructed at a distance from trench 101, barrier layer 103 will also cover the interval between trench 101 and berms 102. Barrier layer 103 may comprise an impermeable material such as a treated plastic sheet though, preferably, barrier layer 103 may comprise a material impermeable to hazardous liquids but permeable to non-hazardous liquid such as water to allow drainage, such as an industrial-grade geotextile. The material of the barrier layer 103 may be ISO certified and/or ZeroWaste certified.

At least one pipeline 104 is positioned within the trench 101. Pipeline 104 is a conventional pipeline and may carry hazardous liquids such as crude oil or petroleum products. Pipeline 104 is then buried under backfill material 105. Backfill material 105 may be any liquid absorbent material but is typically comprised of material excavated from trench 101 as well as additional material to supplement the excavated material. Backfill material 105 is placed on the barrier layer 103 and pipeline 104. Then, backfill material 105 may be graded to form a grade 107 connecting ridgelines 106.

Preferably, the volume of backfill material 105 along a length of a non-reservoir segment is at least approximately equal to the volume of the pipeline 104 along the same length, with berms 102 and trench 101 sized appropriately to accommodate the volume of backfill. However, because backfill material 105 may absorb spilled or leaked hazardous liquids, it may be desirable to increase the amount of backfill material 105 relative to the volume of pipeline 104 by, for example, modifying the height or width of berms 102, modifying the dimensions of trench 101, or modifying the distance between berms 102 and trench 101.

While barrier layer 103 is preferably in one piece, the barrier layer 103 may comprise segments of barrier material which may be fused together; adhered together with cold adhesives or heat-activated adhesives; stitched together using tensile strength architectural yarn; overlaid atop each other; or some combination thereof. If the barrier layer 103 material is overlaid, because some pipelines generally run along altitudinal gradients, it may be preferable to overlay the barrier layer 103 material in a pattern with higher altitude barrier layer 103 material being placed atop, rather than below, the lower altitude barrier layer 103 material.

Figure 2:
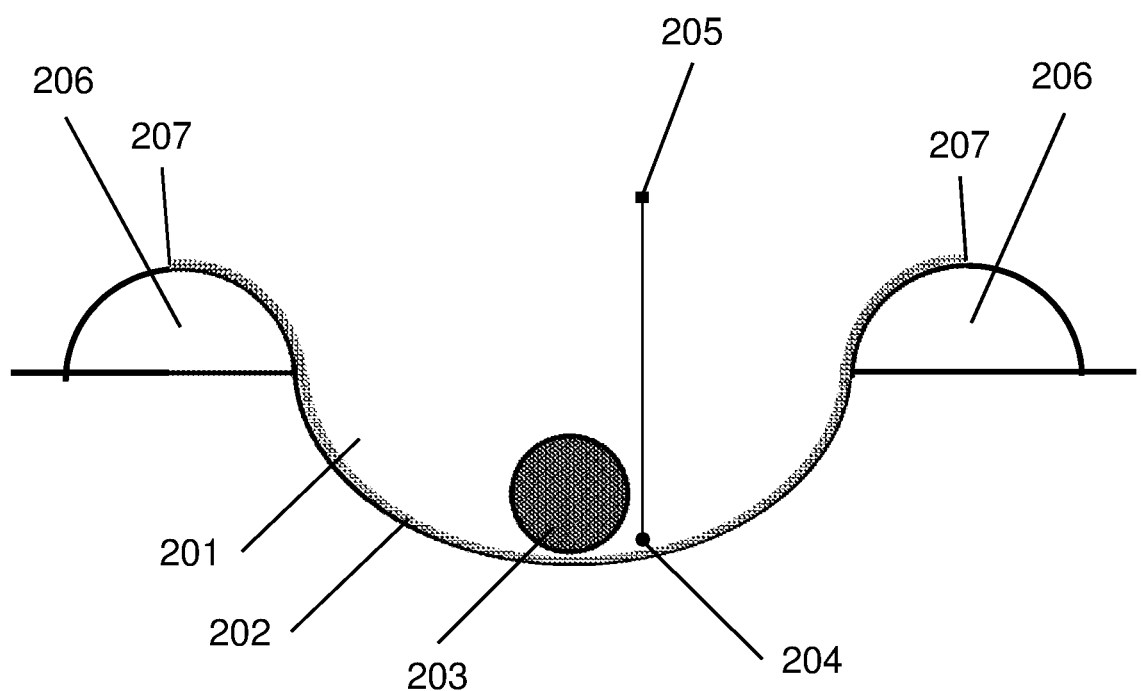
FIG. 2 is a cross-section of a reservoir segment of an embodiment of the present invention

FIG. 2. Illustrates another aspect, the reservoir segment, of an embodiment of the present invention. The reservoir segment comprises a reservoir trench 201, reservoir barrier layer 202, pipeline 203, hazardous liquid sensor 204, and hazardous liquid indicator 205. Optionally, reservoir berms 206 with ridgelines 207 may be constructed.

When a reservoir segment is constructed in conjunction with a non-reservoir segment, reservoir trench 201 may be a connected to trench 101, though reservoir trench 201 may be wider than trench 101. The dimensions of reservoir trench 201 may vary depending on industry practices, regulations, local conditions, design objectives, and design constraints, but generally the dimensions may account for the flowrate of pipeline 203, the frequency with which the reservoir segment may be monitored for leaks and spills, as well as any tolerance or margin for error, such that the reservoir segment will likely contain a leak or spill from pipeline 203 until the leak or spill can be detected and remediated.

Optionally, if reservoir berms 206 are constructed, reservoir berms 206 may be a connected to berms 102. Reservoir berms may generally follow the contour of reservoir trench 201. Reservoir berms 206 may also be constructed a distance from reservoir trench 201 The dimensions of reservoir berms 206 may vary depending on industry practices, regulations, local conditions, design objectives, and design constraints, but will account generally for the flowrate of pipeline 203 as well as the frequency with which the reservoir segment may be monitored for leaks and spills, as well as any tolerance or margin for error, such that the reservoir segment will likely contain a leak or spill from pipeline 203 until the leak or spill can be detected and remediated.

Reservoir barrier layer 202 covers the floor and sides of reservoir trench 201 and, if reservoir berms 206 are constructed, reservoir barrier layer 202 further covers the interior sides of reservoir berms 206 up to at least the ridgelines 207. Reservoir barrier layer 202 may be wider than barrier layer 103 to accommodate the wider dimensions of reservoir trench 201.

Reservoir barrier layer 202 is preferably sufficiently heavy such that it cannot be readily moved. Optionally, reservoir barrier layer 202 may alternatively be stabilized using auger anchors, stakes, or the addition of weight, such as building material or even backfill, distributed on the upper surface of reservoir barrier layer 202. Optionally and alternatively, reservoir barrier layer 202 may also be integrated into optional reservoir berms 206 in that, while the construction of reservoir berms 206 is underway and only a portion of the completed height of reservoir berms 206 has been reached, the nearest edges of reservoir barrier layer 202 may be placed on top of the partially completed reservoir berms 206, with the remaining portion of reservoir berms 206 constructed on top of the nearest edges of reservoir barrier layer 202, thus further securing reservoir barrier layer 202.

At least one pipeline 204 traverses the reservoir above the reservoir barrier layer 202. Optionally, if required by industry practices, regulations, local conditions, design objectives, and design constraints, pipeline 204 may be supported by bedding or structural support members which are not pictured.

At least one hazardous liquid sensor 204 is located near the bottom of the reservoir, above reservoir barrier layer 202. Hazardous liquid sensor 204 may be any conventional sensor which may output a signal upon detection of at least one hazardous liquid, such as crude oil or petroleum products. Hazardous liquid sensor 204 is operatively coupled to a hazardous liquid indicator 205. Hazardous liquid indicator 205 may be a radio, light, infrared emitter, siren, or combination thereof. In the event hazardous liquid sensor 207 detects the presence of a hazardous liquid, hazardous liquid sensor 207 relays the information to hazardous liquid indicator 208 which communicates the presence of hazardous liquid by emitting radio frequency signals, visible signals, infrared signals, acoustic signals, or some combination thereof. Hazardous liquid indicator 205 may be positioned such that it is visible to observers and bystanders outside the reservoir, including positioning above reservoir berms 206 if applicable. The hazardous liquid sensor 207 and the hazardous liquid indicator 206 may be powered by, for example, batteries, solar panels, grid power, auxiliary power running along with the pipeline, or some combination thereof.

Optionally and not pictured, if required by industry practices, regulations, local conditions, design objectives, and design constraints, backfill may be inserted into reservoir trench 201, above reservoir barrier layer 202, until the backfill covers pipeline 203.

Figure 3:
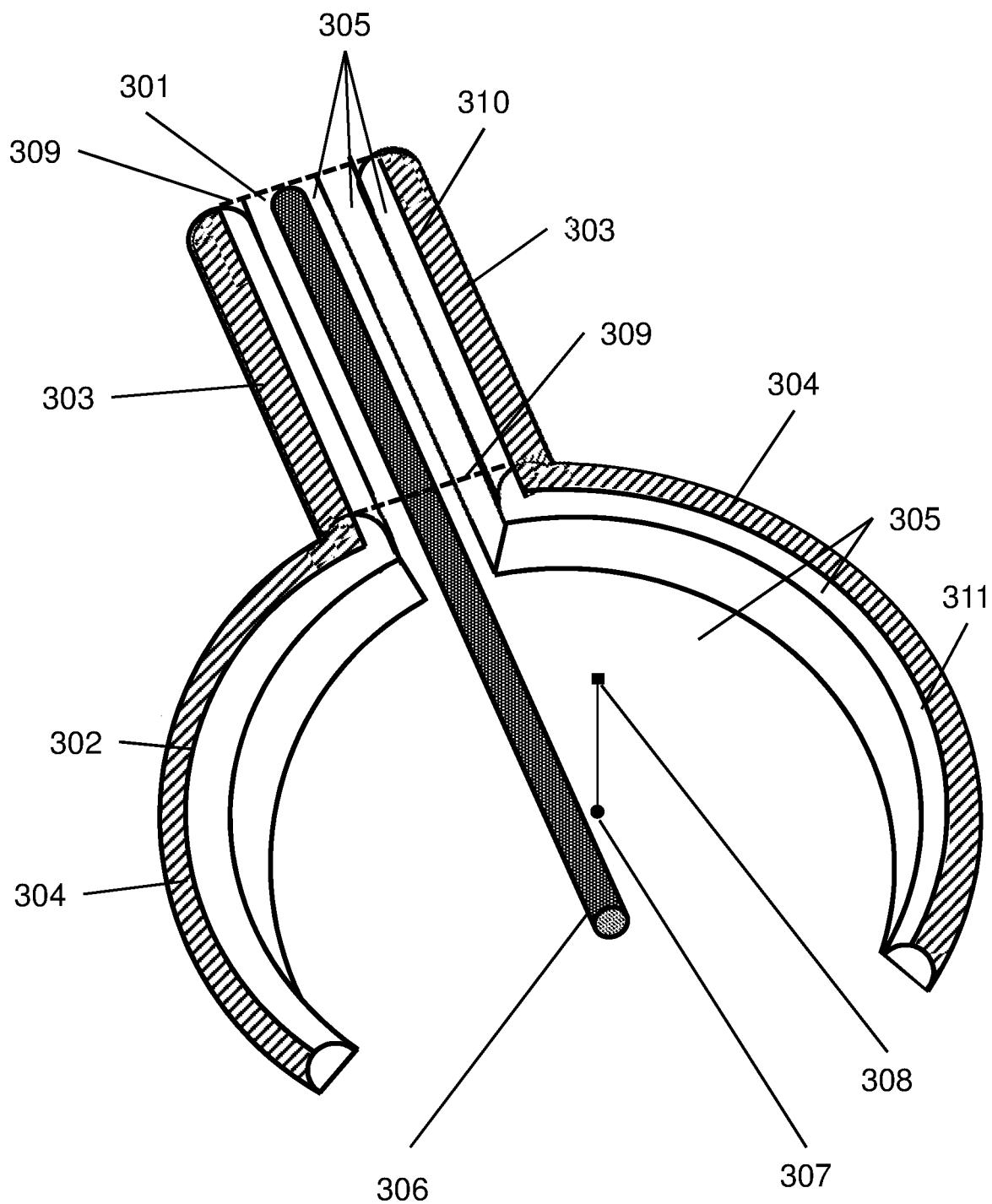
FIG. 3 is an overhead view of a non-reservoir segment coupled to a reservoir segment, with a portion of the reservoir segment cut away.

FIG. 3 illustrates another aspect of the present invention, including a portion of a non-reservoir segment operatively connected to a cut-away portion of a reservoir segment of the present invention. This aspect comprises trench 301, reservoir trench 302, berms 303, reservoir berms 304, barrier layer 305, pipeline 306, hazardous liquid sensor 307, hazardous liquid indicator 308, grade 309, berm ridgelines 310, and reservoir berm ridgelines 311. In FIG. 3, trench 301 is excavated and meets reservoir trench 302 which may be broader than trench 301. While reservoir trench 302 in FIG. 3 is approximately circular, the circular shape is not necessary as reservoir trench 302 may be excavated in other forms. The dimensions of reservoir trench 302 may vary depending on industry practices, regulations, local conditions, design objectives, and design constraints, but preferably the dimensions will account generally for the flowrate of pipeline 306, the frequency with which the reservoir segment may be monitored for leaks and spills, as well any tolerance or margin for error, such that the reservoir segment will likely contain a leak or spill from pipeline 306 until the leak or spill can be detected and remediated.

Berms 303 are constructed along the perimeter of trench 301, and are generally parallel. Berms 303 include berm ridgelines 310. Though the form of berms 303 may vary, and even perhaps the form of each berm in berm 303 may vary from the other, the ridgelines 310 are typically the line of crests along each berm of berms 303 or, if any of berms 303 have no crest, generally any line along the highest portion of the berm. Moreover, each ridgeline 310 of the individual berms in berm 303 may differ.

While berms 303 are shown to be constructed immediately adjacent to trench 301, such proximity is not necessary and berms 303 may be constructed away from trench 301.

Optionally, reservoir berms 304 may be constructed. Reservoir berms include reservoir berm ridgelines 311. Reservoir berms 304 may be constructed immediately adjacent to reservoir trench 302 or may be constructed at a distance away from reservoir trench 302, substantially following the perimeter of reservoir trench 302. The dimensions and placement of reservoir berms 304 may vary depending on industry practices, regulations, local conditions, design objectives, and design constraints, but will account generally for the flowrate of pipeline 306, the frequency with which the reservoir segment may be monitored for leaks and spills, as well as any tolerance or margin for error, such that the reservoir segment will likely contain a leak or spill from pipeline 306 until the leak or spill can be detected and remediated.

Barrier layer 305 covers the floor and sides of trench 301 and the interior sides of berms 302 up to, at least, the berm ridgelines 310. Further, barrier layer 303 also covers the floor and sides of reservoir trench 302. If optional reservoir berms 304 have been constructed, barrier layer 303 also covers the interior sides of reservoir berm 304 up to, at least, the reservoir berm ridgelines 311.

Barrier layer 305 is preferably sufficiently heavy such that it cannot be readily moved. Optionally, barrier layer 305 may alternatively be stabilized using auger anchors, stakes, or the addition of weight, such as building material or even backfill, distributed on the upper surface of barrier layer 305. Optionally and alternatively, barrier layer 305 may also be integrated into optional reservoir berms 304 in that, while the construction of reservoir berms 304 is underway and only a portion of the completed height of reservoir berms 304 has been reached, the nearest edges of barrier layer 305 may be placed on top of the partially completed reservoir berms 304, with the remaining portion of reservoir berms 304 constructed on top of the nearest edges of barrier layer 305, thus further securing barrier layer 305.

Pipeline 306 is positioned such that it travels through trench 301 and reservoir trench 302, and above barrier layer 305. Pipeline 306 may be supported by bedding or structural support members, which are not pictured.

While not shown in FIG. 3, pipeline 306 may continue from the reservoir segment into a second non-reservoir segment wherein reservoir trench 302 is coupled to a second trench through which pipeline 306 continues to traverse; barrier layer 303 is extended to cover this second trench; and, if applicable, reservoir berms 304 are coupled to a second set of berms with barrier layer 303 extended to cover the interior sides of the second set of berms up to at least the ridgeline of this second set of berms.

Hazardous liquid sensor 307 is disposed at the bottom of reservoir trench 302 and above barrier layer 305. Hazardous liquid sensor 307 may be any typical sensor which may output a signal upon detection of at least one hazardous liquid, such as crude oil or petroleum products. Hazardous liquid indicator 308 is communicatively coupled to hazardous liquid sensor 307. Hazardous liquid indicator 308 may be a radio, light, infrared emitter, siren, or combination thereof. In combination, hazardous liquid indicator 308 will generate a signal detectable by observers when hazardous liquid sensor 307 detects hazardous liquid. Hazardous liquid indicator 308 may be positioned such that its signal can be detected by observers. Backfill is then inserted into the non-reservoir segment, on top of pipeline 306 and barrier layer 305 as shaped by trench 301 and berms 302, and graded to form grade 309 that connects berm ridgelines 310.

Should a leak or spill of hazardous liquid manifest in a non-reservoir segment of pipeline 306, the hazardous liquid will flow and may be absorbed by backfill until the hazardous liquid reaches barrier layer 305. Lined with barrier layer 305, trench 301 is capable of holding and channeling hazardous liquids, and is assisted further by berms 303 which prevent the containment system from being overtopped by hazardous liquids. Generally, pipeline 306 runs along altitudinal gradients so barrier layer 305, shaped by trench 301 and berms 303, acts as a guide and directs the hazardous liquid, pulled by gravity, toward a reservoir segment with a reservoir trench 302 lined with barrier layer 305 where the hazardous liquid will continue to pool. Optionally, reservoir berms 304 lined with barrier layer 302 may also be constructed around the perimeter of reservoir trench 302 to prevent reservoir trench 302 from being overtopped.

As the hazardous liquid pools on barrier layer 305 at the bottom of reservoir trench 302, it will be detected by hazardous liquid sensor 307 which in turn activates hazardous liquid indicator 308. Hazardous liquid indicator 308 then signals that a spill or leak has been detected and remediation is required. The hazardous liquid indicator 308 may be detected by manned or unmanned aircraft, firewatch towers, passersby, or other observers. The hazardous liquid indicator 308 is positioned such that its signal may be detected by observers.

Preferably, a reservoir segment is constructed along each mile of non-reservoir segment, and at the least, one reservoir segment should be constructed for every five miles of non-reservoir segment. Nevertheless, industry practices, regulations, local conditions, design objectives, and design constraints, may require reservoir segments to be placed more or less frequently than preferred.

To aid in remediation, trench 301, reservoir trench 302, berms 303, barrier layer 305, and optionally reservoir berms 304 prevent the hazardous liquid from escaping the containment system while backfill may absorb some portion of the hazardous liquid. Cleanup includes removal of contaminated backfill which can be transported and remediated off-site, perhaps at a more cost-effective locale, and chemically removing and vacuuming any hazardous liquid which remains on barrier layer 305.

Figure 4:
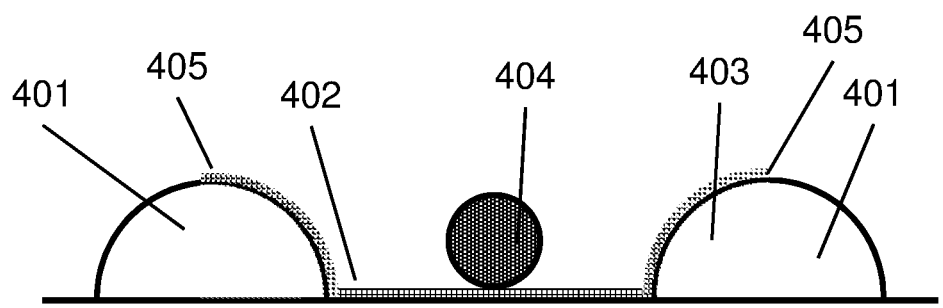
FIG. 4 is a cross-section of a non-reservoir segment of an embodiment of the present invention.

FIG. 4 illustrates a non-reservoir segment of an aboveground embodiment of the present invention. The non-reservoir segment comprises berms 401, pipeline path 402, barrier layer 403, pipeline 404, and ridgelines 405. Berms 401 are constructed generally parallel to each other, defining a pipeline path 402. Though berms 401 are shown constructed with a semi-circular profile, berms 401 may take other forms. Berms 401 may comprise construction materials such as earth, rock, concrete, plastics, metallic compositions, or some combination thereof such as rebar. Further, while berms 401 are comprised of two berms, some embodiments may include a single berm constructed in conjunction with a naturally occurring or pre-existing artificial structure which may be used as a second berm.

Berms 401 include ridgelines 405. Though the form of berms 401 may vary, and even perhaps the form of each berm in berm 401 may vary from the other, the ridgelines 405 are typically the line of crests along each berm of berms 401 or, if any of berms 401 have no crest, generally any line along the highest portion of the berm. Moreover, each ridgeline 405 of the individual berms in berm 401 may differ.

Barrier layer 403 is deployed to cover pipeline path 402 and the interior sides of berms 401 up to ridgelines 405. Berms 401 may be sized such that the volume between the two berms 401 along the length of a non-reservoir segment, less the volume of the pipeline 404 and barrier layer 403, is at least approximately equal to the volume of the pipeline 104 along the same length.

Barrier layer 403 is preferably sufficiently heavy such that it is fixed and cannot be readily moved. However, barrier layer 403 may alternatively be fixed using auger anchors, stakes, or the addition of weight, such as building material or even backfill, distributed on the upper surface of barrier layer 403. Additionally, alternatively, barrier layer 403 may also be integrated into berms 401 in that, while the construction of berms 401 is underway and only a portion of the completed height of berms 401 has been reached, the nearest edges of barrier layer 403 may be placed on top of the partially completed berms 401, with the remaining portion of berms 401 constructed on top of the nearest edges of barrier layer 403, thus further securing barrier layer 403.

Pipeline 404 is disposed along pipeline path 402.

Figure 5:
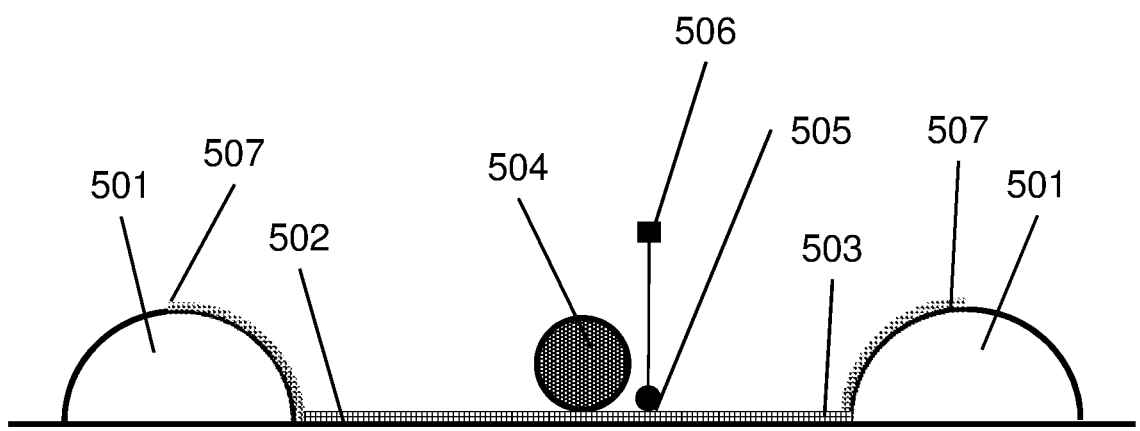
FIG. 5 is a cross-section of a reservoir segment of an embodiment of the present invention.

FIG. 5 illustrates a reservoir segment of an above-ground embodiment of the present invention. The reservoir segment comprises reservoir berms 501, reservoir pool 502, barrier layer 503, pipeline 504, hazardous liquid sensor 505, hazardous liquid indicator 506, and reservoir berm ridgelines 507. Reservoirs may be placed intermittently along runs of non-reservoir segments. Preferably, a reservoir segment is constructed along each mile of non-reservoir segment. Preferably, at minimum, one reservoir segment should be constructed every five miles of non-reservoir segment. Nevertheless, industry practices, regulations, local conditions, design objectives, and design constraints may require reservoir segments to be placed more or less frequently than the preferred interval.

Reservoir berms 501 are constructed defining a reservoir pool 502. Reservoir berms 501 include reservoir berm ridgelines 507. Though the form of reservoir berms 501 may vary, and even perhaps the form of each berm in reservoir berm 501 may vary from the other, reservoir berm ridgelines 507 are typically the line of crests along each berm of reservoir berm 501 or, if any of reservoir berm 501 have no crest, generally any line along the highest portion of the berm. Moreover, each reservoir berm ridgeline 507 of the individual berms in reservoir berm 501 may differ.

Reservoir pool 502 is generally wider than the pipeline path 402 of non-reservoir segments. The size and shape of reservoir pool 502 may vary depending on industry practices, regulations, local conditions, design objectives, and design constraints, but generally the dimensions may account for the flowrate of pipeline 504, the frequency with which the reservoir segment may be monitored for leaks and spills, as well as any tolerance or margin for error, such that the reservoir segment will likely contain a leak or spill from pipeline 504 until the leak or spill can be detected and remediated.

Barrier layer 503 is deployed to cover reservoir pool 502 and reservoir berms 501, including the sides of reservoir berms 501 up to at least the reservoir berm ridgelines 507. Barrier layer 503 is preferably sufficiently heavy such that it is fixed and cannot be readily moved. However, barrier layer 503 may alternatively be fixed using auger anchors, stakes, or the addition of weight, such as building material or even backfill, distributed on the upper surface of barrier layer 503. Additionally, alternatively, barrier layer 503 may also be integrated into reservoir berms 501 in that, while the construction of reservoir berms 501 is underway and only a portion of the completed height of reservoir berms 501 has been reached, the nearest edges of barrier layer 503 may be placed on top of the partially completed reservoir berms 501, with the remaining portion of reservoir berms 501 constructed on top of the nearest edges of barrier layer 503, thus further securing barrier layer 503.

Pipeline 504 is positioned to traverse reservoir pool 402. Hazardous liquid sensor 505 is positioned near the bottom of reservoir pool 502 but above barrier layer 503. Hazardous liquid sensor 505 may be any conventional sensor which may output a signal upon detection of at least one hazardous liquid, such as crude oil or petroleum products. Hazardous liquid indicator 506 is operatively coupled to hazardous liquid sensor 505 and hazardous liquid sensor 505 may preferentially be located above reservoir berms 501. Hazardous liquid indicator 506 may be a radio, light, infrared emitter, siren, or combination thereof. The hazardous liquid sensor 505 and the hazardous liquid indicator 506 may be powered by, for example, batteries, solar panels, grid power, auxiliary power running alongside the pipeline, or some combination thereof.

Figure 6:
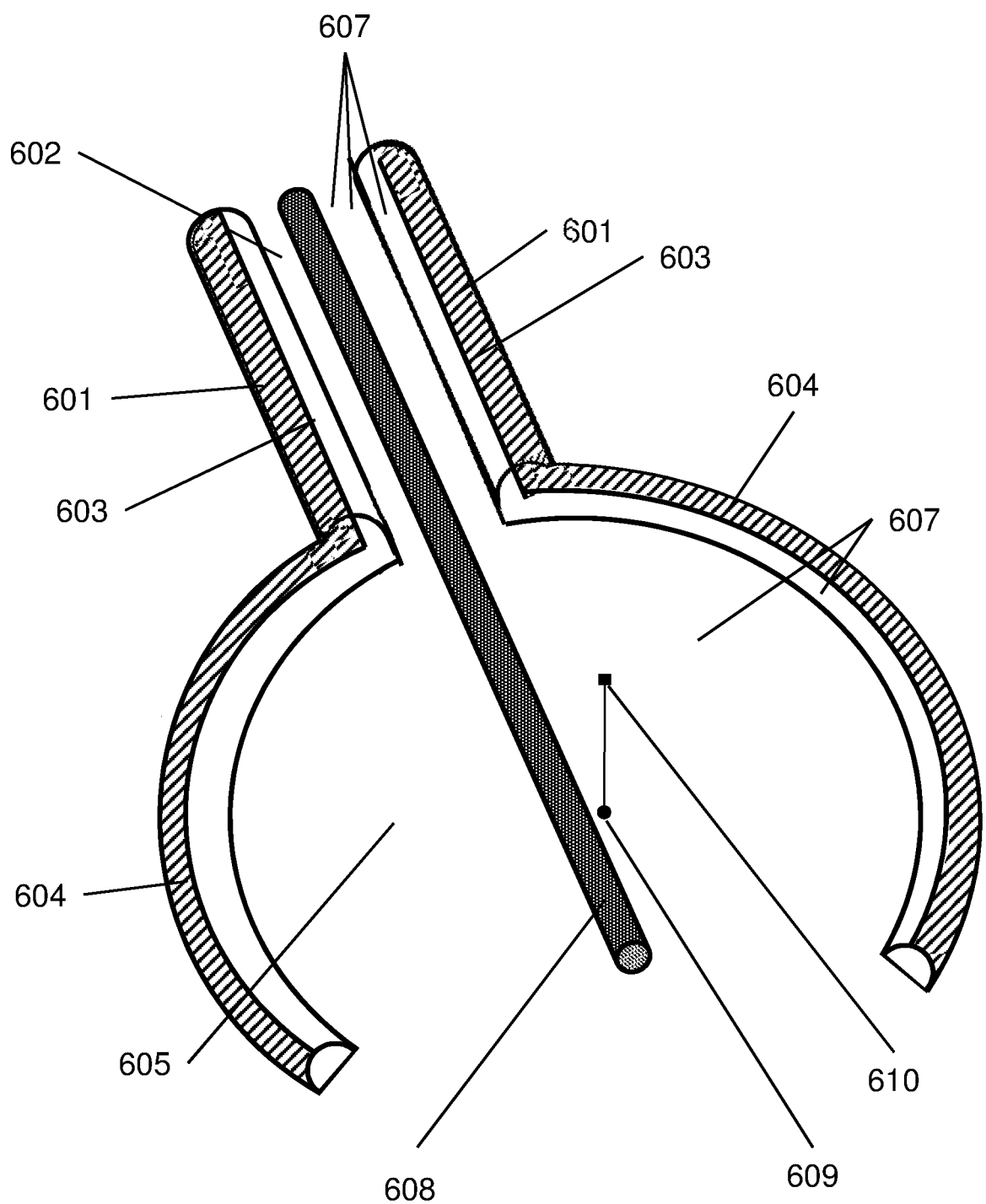
FIG. 6 is an overhead view of a non-reservoir segment coupled to a reservoir segment, with a portion of the reservoir segment cut away.

FIG. 6 illustrates another aspect of the present invention, including both a portion of a non-reservoir segment as well as a portion of the reservoir segment of the present invention. This aspect comprises berms 601, pipeline path 602, berm ridgelines 603, reservoir berms 604, reservoir pool 605, reservoir berm ridgelines 606, barrier layer 607, pipeline 608, hazardous liquid sensor 609, and hazardous liquid indicator 610. Berms 601 are constructed generally parallel to each other, defining a pipeline path 602. Berms 601 include berm ridgelines 603. Reservoir berms 604 define a reservoir pool 605.

The size and shape of reservoir pool 605, as well as the size, shape, and placement of reservoir berms 604, may vary depending on industry practices, regulations, local conditions, design objectives, and design constraints, but generally the dimensions of reservoir pool 605 and reservoir berms 604 may account for the flowrate of pipeline 608, the frequency with which the reservoir segment may be monitored for leaks and spills, as well any tolerance or margin for error, such that the reservoir segment will likely contain a leak or spill from pipeline 608 until the leak or spill can be detected and remediated Reservoir berms 604 include reservoir berm ridgelines 606. Barrier layer 607 covers the floor of the pipeline path 602 and the interior wall of berm 302 up to at least berm ridgeline 606. Pipeline 608 is positioned along pipeline path 602 and reservoir pool 605 and above barrier layer 607.

Barrier layer 607 is preferably sufficiently heavy such that it is self-stabilized. However, barrier layer 607 may alternatively be stabilized using auger anchors, stakes, or the addition of weight, such as building material or even backfill, distributed on the upper surface of barrier layer 607.

Additionally, alternatively, barrier layer 607 may also be integrated into reservoir berms 604 in that, during the construction of reservoir berms 604 and only a portion of the completed height of reservoir berms 604 has been reached, the nearest edges of barrier layer 607 may be placed atop the partially completed reservoir berms 604, with the remaining portion of reservoir berms 604 constructed on top of the nearest edges of barrier layer 607, thus further securing barrier layer 607.

Hazardous liquid sensor 609 is disposed near the upper surface of barrier layer 607. Hazardous liquid sensor 609 may be any typical conventional sensor which may output a signal upon detection of at least one hazardous liquid, such as crude oil or petroleum products. Hazardous liquid indicator 601 may be a radio, light, infrared emitter, siren, or combination thereof. Hazardous liquid indicator 610 is communicatively coupled to hazardous liquid sensor 609 and hazardous liquid indicator 610 may emit radio frequency signals, visible signals, infrared signals, acoustic signals, or some combination thereof.

While not shown in FIG. 6, pipeline 608 may continue from the reservoir segment into a second non-reservoir segment wherein reservoir berms 604 are coupled to a second set of berms with barrier layer 607 extended to cover the interior sides of the second set of berms up to at least the ridgeline of this second set of berms; and reservoir pool 605 is coupled to a second pipeline path through which pipeline 608 continues to traverse and barrier layer 607 is extended to cover this second pipeline path.

In the event of a leak or spill by pipeline 608 in a non-reservoir segment, hazardous liquid will pool on barrier layer 607 and funneled toward a reservoir segment. Once the hazardous liquid reaches the reservoir segment and hazardous liquid sensor 609, hazardous liquid sensor 609 relays the information to hazardous liquid indicator 610 which will activate, broadcasting that spilled or leaked hazardous liquid has been detected. Remediation of the spill or leak may entail washing the hazardous liquid from barrier layer 607 in the non-reservoir segment and the reservoir segment, then removing the hazardous liquid by vacuum.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for the containment of pipeline spills and leaks comprising:
   a non-reservoir segment, comprising:
      a pipeline for transporting a first liquid;
      a barrier layer comprising material impermeable to the first liquid;
      a non-reservoir trench excavated below ground level with sufficient depth and width to accommodate at least the pipeline as well as the barrier layer;
      two berms, each above ground level, comprising a longitudinal axis and a ridgeline; and
      a backfill;
      wherein the two berms are substantially parallel along the longitudinal axes and positioned on either side of the non-reservoir trench; the barrier layer is disposed to cover the non-reservoir trench and the berms, reaching at least the ridgelines of the two berms; the pipeline is disposed within the non-reservoir trench above the barrier layer; and the backfill is located on top of the pipeline and the barrier layer, forming a grade bridging the ridgelines of the two berms; and
   a reservoir segment, comprising:
      a reservoir trench excavated below ground level and wider than the non-reservoir trench;
      wherein the reservoir trench is connected to the non-reservoir trench; the barrier layer extends through to cover the reservoir trench, the non-reservoir trench, and the berms, reaching at least the ridgelines of the two berms; and the pipeline extends through and is disposed within the reservoir trench and the non-reservoir trench, and above the barrier layer of the reservoir trench and the non-reservoir trench.

2. The system of claim 1, wherein the reservoir segment further comprises:
   two reservoir berms, each above ground level, each comprising a longitudinal axis and a ridgeline;
   wherein the two reservoir berms are positioned substantially parallel along the longitudinal axes and positioned on either side of the reservoir trench, and the two reservoir berms are connected to the two berms of the non-reservoir segment; and the barrier layer is extended to cover at least up to the reservoir berm ridgelines.

3. The system of claim 2, wherein the non-reservoir segment and the reservoir segment further comprise:
   a hazardous liquid sensor for detecting the first liquid, disposed within the reservoir trench and positioned above the barrier layer; and
   a hazardous liquid indicator operatively coupled to the hazardous liquid sensor.

4. The system of claim 3, wherein the barrier layer is impermeable to the first liquid and permeable to a second liquid.

5. The system of claim 4, wherein the first liquid is crude oil, petroleum products, or some combination thereof, and the second liquid is water.

6. The system of claim 1, wherein the barrier layer is impermeable to crude oil, petroleum products, or some combination thereof, and permeable to water.

7. A system for the containment of pipeline spills and leaks comprising:
   a non-reservoir segment, comprising:
      a pipeline for transporting a first liquid;
      a barrier layer comprising material impermeable to the first liquid; and
      two berms, each above ground level, each comprising a longitudinal axis and a ridgeline, the two berms being substantially parallel along the longitudinal axes and define a pipeline path which is sufficiently wide to accommodate the pipeline and the barrier layer;
      wherein the barrier layer is disposed to cover the pipeline path and the two berms, reaching at least the ridgelines of the two berms; and the pipeline is disposed within the pipeline path above the barrier layer;
   and a reservoir segment, comprising:
      two reservoir berms, each above ground level, and each comprising a longitudinal axis and a ridgeline, the two reservoir berms defining a reservoir pool for accumulating the first liquid;
      wherein the reservoir pool is connected to the pipeline path; the two reservoir berms are connected to the two berms; the barrier layer extends through to cover the pipeline pathway, the two berms, reaching at least the ridgelines of the two berms, the reservoir pool and the two reservoir berms, reaching at least the reservoir berm ridgelines; and the pipeline extends through such that the pipeline is disposed within the pipeline path and the reservoir pool, and above the barrier layer.

8. The system of claim 7, wherein the non-reservoir segment and the reservoir segment further comprise:
a hazardous liquid sensor for detecting the first liquid disposed within the reservoir trench and positioned above the barrier layer; and
a hazardous liquid indicator operatively coupled to the hazardous liquid sensor.

9. The system of claim 8, wherein the barrier layer is impermeable to the first liquid and permeable to a second liquid.

10. The system of claim 9, wherein the first liquid is crude oil, petroleum products, or some combination thereof, and the second liquid is water.

11. The system of claim 7, wherein the barrier layer is impermeable to a first liquid, where the first liquid is crude oil, petroleum products, or some combination thereof, and the barrier layer is permeable to water.

12. A method for the construction of a system for the containment of pipeline spills and leaks comprising:
excavation of a non-reservoir trench below ground level with sufficient depth and width to accommodate at least a pipeline for transporting a first liquid, as well as a barrier layer;
construction of two non-reservoir berms above ground level, each non-reservoir berm comprising a longitudinal axis and a ridgeline, the non-reservoir berms substantially parallel along the longitudinal axes to the non-reservoir trench;
deployment of the barrier layer covering the non-reservoir trench as well as the two non-reservoir berms, including up to the ridgeline of the two non-reservoir berms, the barrier layer comprising a material impermeable to the first liquid;
disposition of the pipeline within the trench and above the barrier layer;
deployment of a backfill between the two berms;
grading the backfill to form a grade bridging the ridgeline of the two berms;
excavation of a reservoir trench below ground level, connected to the non-reservoir trench;
extension of the barrier layer from the non-reservoir trench to cover the reservoir trench; and
extension of the pipeline from the non-reservoir trench such that the pipeline traverses the reservoir trench.

13. The method of claim 12, further comprising:
placement of a hazardous liquid sensor within the reservoir trench and above the barrier layer; and
operatively coupling the hazardous liquid sensor to a hazardous liquid indicator.

14. The method of claim 12, further comprising:
construction of two reservoir berms above ground level, each reservoir berm comprising a ridgeline and a longitudinal axis, the reservoir berms substantially parallel along the longitudinal axes and positioned generally around the reservoir trench, and the two reservoir berms are connected to the non-reservoir berms; and
extension of the barrier layer to cover the reservoir berms up to at least the reservoir berm ridgelines.

* * * * *